US010278202B2

(12) United States Patent
Bontu et al.

(10) Patent No.: US 10,278,202 B2
(45) Date of Patent: Apr. 30, 2019

(54) COORDINATED SCHEDULING IN A CELLULAR NETWORK

(71) Applicant: Telefonaktiebolaget LM Ericsson (publ), Stockholm (SE)

(72) Inventors: Chandra Sekhar Bontu, Nepean (CA); Peter Hazy, Ottawa (CA); Patrick Lie Chin Cheong, Kanata (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 20 days.

(21) Appl. No.: 15/541,141

(22) PCT Filed: Jan. 5, 2015

(86) PCT No.: PCT/IB2015/050074
§ 371 (c)(1),
(2) Date: Jun. 30, 2017

(87) PCT Pub. No.: WO2016/110743
PCT Pub. Date: Jul. 14, 2016

(65) Prior Publication Data
US 2017/0353967 A1 Dec. 7, 2017

(51) Int. Cl.
*H04W 72/12* (2009.01)
*H04L 5/00* (2006.01)
*G06F 17/18* (2006.01)
*H04J 11/00* (2006.01)

(52) U.S. Cl.
CPC ........ *H04W 72/1247* (2013.01); *G06F 17/18* (2013.01); *H04L 5/0035* (2013.01);
(Continued)

(58) Field of Classification Search
CPC ............. H04W 16/32; H04W 72/1247; H04W 72/1278; H04W 72/1289; H04L 5/0035; H04L 5/0073
See application file for complete search history.

(56) References Cited

U.S. PATENT DOCUMENTS 9,572,115 B2 2/2017 Bontu et al.
2016/0338098 A1* 11/2016 Li ........................ H04W 16/14

OTHER PUBLICATIONS

Author Unknown, "Technical Specification Group Radio Access Network; Evolved Universal Terrestrial Radio Access (E-UTRA); Physical layer procedures (Release 11)," Technical Specification 36.213, Version 11.5.0, 3GPP Organizational Partners, Dec. 2013, 182 pages.

(Continued)

*Primary Examiner* — Pao Sinkantarakorn
(74) *Attorney, Agent, or Firm* — Sage Patent Group

(57) ABSTRACT

Systems and methods related to scheduling for a cluster of cells controlled by a base station of a cellular communications network are disclosed. In some embodiments, a method of operation of a base station in a cellular communications network to provide scheduling for a cluster of cells controlled by the base station is provided. In some embodiments, the method of operation of the base station comprises identifying a first set of Radio Access Bearers (RABs) for cluster scheduling for a Transmit Time Interval (TTI) and a second set of RABs for individual cell scheduling for the TTI, where the first set of RABs and the second set of RABs are non-overlapping sets. The method further includes performing cluster scheduling for the first set of RABs for the TTI and performing individual cell scheduling for the second set of RABs for the TTI.

18 Claims, 11 Drawing Sheets

(52) U.S. Cl.
CPC ..... *H04L 5/0073* (2013.01); *H04J 2011/0096* (2013.01); *H04W 72/1278* (2013.01)

(56) References Cited

OTHER PUBLICATIONS

Author Unknown, "Technical Specification Group Radio Access Network; Evolved Universal Terrestrial Radio Access (E-UTRA); Radio Resource Control (RRC); Protocol specification (Release 12)," Technical Specification 36.331, Version 12.3.0, 3GPP Organizational Partners, Sep. 2014, 378 pages.
Cavalcanti, Francisco et al, "Chapter 4.3: Congestion Control Framework and Radio Resource Management," in Optimizing Wireless Communication Systems (book), vol. 386, 2009, Springer Science + Business Media, LLC, 3 pages.
CMCC, "R3-140070: Partial Measurement Reports Exchange for CoMP-NIB," 3rd Generation Partnership Project, TSG RAN WG3 Meeting #83, Feb. 10-14, 2014, 2 pages, Prague, Czech Republic.
Potevio, "R1-091970: Discussion of interference coordination for inter-eNB CoMP Transmission," 3rd Generation Partnership Project, TSG-RAN WG1 #57, May 4-8, 2009, 6 pages, San Francisco, USA.
International Search Report and Written Opinion for International Patent Application No. PCT/IB2015/050074, dated Sep. 4, 2015, 12 pages.
International Preliminary Report on Patentability for International Patent Application No. PCT/IB2015/050074, dated Jul. 20, 2017, 9 pages.

\* cited by examiner

COORDINATED SCHEDULING IN A CELLULAR NETWORK

This application is a 35 U.S.C. § 371 national phase filing of International Application No. PCT/IB2015/050074, filed Jan. 5, 2015, the disclosure of which is incorporated herein by reference in its entirety.

TECHNICAL FIELD

The present disclosure relates to scheduling in a cellular communications network.

BACKGROUND

In a single frequency cellular communications network with high system loads, coordinating radio resource allocation between neighboring cells improves the overall system capacity and coverage. In coordinated resource allocation, a set of radio resources in a cell are allocated to a User Equipment (UE) with the knowledge of allocation of the corresponding radio resources in neighboring cell(s). By properly coordinating the radio resource usage in the cells, inter-cell interference can be mitigated. For example, a UE that is experiencing interference from a neighboring cell may have better performance when the serving cell of that UE allocates radio resources to the UE over which the neighboring cell transmits at a low transmit power level.

Most of the current cellular communications networks utilize individual radio resource schedulers for each cell. Normally, there is limited or no coordination among the cells in the current single frequency cellular networks when the radio resources are assigned for downlink and uplink transmissions.

Starting with Release 8, the $3^{rd}$ Generation Partnership Project (3GPP) Long Term Evolution (LTE) specifications include explicit support for Inter-Cell Interference Coordination (ICIC). In particular, a set of messages are defined that can be exchanged between enhanced, or evolved, Node Bs (eNBs) using the X2 interface. These messages provide information about the interference being created or experienced by the eNB issuing the messages. Using these messages, the inter-cell interference between neighboring cells may be taken into account by the individual cell schedulers of the different eNBs to at least partly mitigate the inter-cell interference.

While 3GPP LTE provides ICIC, the amount of information that can be exchanged over the X2 interface is limited in order to reduce backhaul bandwidth requirements. As such, the coordinated scheduling between cells is limited. Therefore, there is a need for systems and methods for improved coordinated scheduling between cells in a cellular communications network such as a 3GPP LTE network.

SUMMARY

Systems and methods related to scheduling for a cluster of cells controlled by a base station of a cellular communications network are disclosed. In some embodiments, a method of operation of a base station in a cellular communications network to provide scheduling for a cluster of cells controlled by the base station is provided. In some embodiments, the method of operation of the base station comprises identifying a first set of Radio Access Bearers (RABs) for cluster scheduling for a Transmit Time Interval (TTI) and a second set of RABs for individual cell scheduling for the TTI, where the first set of RABs and the second set of RABs are non-overlapping sets. The method further includes performing cluster scheduling for the first set of RABs for the TTI and performing individual cell scheduling for the second set of RABs for the TTI.

In some embodiments, the cluster of cells controlled by the base station comprise at least one of a group consisting of: one or more cells of the base station, one or more cells of one or more remote radio heads controlled by the base station, and one or more cells of one or more other base stations controlled by the base station.

In some embodiments, the method of operation of the base station further comprises identifying a set of wireless devices that are connected to cells in the cluster of cells controlled by the base station and expected to benefit from coordinated scheduling and adjusting priorities of RABs of wireless devices in the set of wireless devices. Further, identifying the first set of RABs for cluster scheduling for the TTI and the second set of RABs for individual cell scheduling for the TTI comprises identifying the first set of RABs for cluster scheduling for the TTI and the second set of RABs for individual cell scheduling for the TTI based on the adjusted priorities of the RABs of at least a subset of the wireless devices in the set of wireless devices.

Further, in some embodiments, identifying the set of wireless devices that are connected to the cells in the cluster of cells controlled by the base station and expected to benefit from coordinated scheduling comprises, for each wireless device connected to the cells in the cluster of cells controlled by the base station, determining whether a performance gain for the wireless device is expected to improve by at least a threshold amount in response to suppression of inter-cell interference from one or more interfering cells with respect to the wireless device. The one or more interfering cells being one or more of the cells in the cluster of cells controlled by the base station. The wireless device is identified as being expected to benefit from coordinated scheduling if the performance gain for the wireless device is expected to improve by at least the threshold amount in response to suppression of the inter-cell interference from the one or more interfering cells.

In some embodiments, adjusting the priorities of the RABs of the wireless devices in the set of wireless devices comprises, for each RAB, computing a differential Priority Queue (PQ) weight for the RAB that is indicative of an expected performance gain for the RAB if clustered scheduling is used for the RAB and adjusting a PQ weight for the RAB based on the differential PQ weight. In some embodiments, computing the differential PQ weight for the RAB comprises computing the differential PQ weight as a ratio of: (a) a function of a Signal-to-Interference-Plus-Noise Ratio (SINR) for the RAB assuming suppression of one or more dominant interferer cells and (b) a function of a SINR for the RAB without suppression of the one or more dominant interferer cells. In some embodiments, adjusting the PQ weight for the RAB comprises summing an initial value for the PQ weight for the RAB and the differential PQ weight for the RAB to thereby adjust the PQ weight for the RAB.

In some embodiments, the RABs of the wireless devices connected to the cells in the cluster of cells controlled by the base station have corresponding PQ weights, and identifying the first set of RABs for cluster scheduling for the TTI and the second set of RABs for individual cell scheduling for the TTI based on the adjusted priorities of the RABs of at least a subset of the wireless devices in the set of wireless devices comprises: (a) prioritizing the RABs of the wireless devices connected to the cells in the cluster of cells controlled by the base station that are to be scheduled for the TTI, including the RABs of the wireless devices in the set of wireless devices that are to be scheduled for the TTI, based on the PQ weights of the RABs, and (b) dividing the RABs of the wireless devices connected to the cells in the cluster of cells controlled by the base station that are to be scheduled for the TTI into the first set of RABs and the second set of RABs based on a defined PQ weight threshold. Further, in some embodiments, the defined PQ weight threshold is a lowest PQ weight of any of the RABs of the set of wireless devices that are to be scheduled for the TTI that results in a number of RABs in the first set of RABs being less than a predefined limit on the number of RABs in the first set of RABs.

In some embodiments, the first set of RABs consist of one or more of the RABs of the at least a subset of the wireless devices in the set of wireless devices having priorities after adjustment that are greater than a defined threshold and one or more RABs of one or more other wireless devices connected to the cells in the cluster of cells controlled by the base station that are to be scheduled in the transmit time internal and have priorities that are greater than the defined threshold. Further, in some embodiments, the defined threshold is a lowest priority, after adjustment, of any of the RABs of the set of wireless devices that are to be scheduled for the TTI that results in the number of RABs in the first set of RABs being less than a predefined limit on the number of RABs in the first set of RABs.

In some embodiments, the method of operation of the base station further comprises identifying a set of wireless devices from all wireless devices that are connected to cells in the cluster of cells controlled by the base station that are expected to benefit from coordinated scheduling and adjusting priorities of RABs of the wireless devices in the set of wireless devices. Further, identifying the first set of RABs for cluster scheduling for the TTI and the second set of RABs for individual cell scheduling for the TTI comprises identifying the first set of RABs for cluster scheduling for the TTI and the second set of RABs for individual cell scheduling for the TTI based on the adjusted priorities of the RABs of a subset of the wireless devices in the set of wireless devices having RABs that are to be scheduled in the TTI.

In some embodiments, identifying the first set of RABs for cluster scheduling for the TTI and the second set of RABs for individual cell scheduling for the TTI is further based on non-adjusted priorities of RABs of other wireless devices that are not in the set of wireless devices and are to be scheduled for the TTI.

In some embodiments, performing cluster scheduling for the first set of RABs for the TTI comprises, for each RAB in the first set of RABs, scheduling one or more radio resources on a serving cell of the corresponding wireless device for the RAB and reserving the same one or more radio resources on one or more interfering cells of the corresponding wireless device. Both the serving cell and the one or more interfering cells being cells in the cluster of cells controlled by the base station.

Embodiments of a base station are also disclosed. In some embodiments, the base station operates according to the embodiments of the method of operation of the base station described above.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1A:
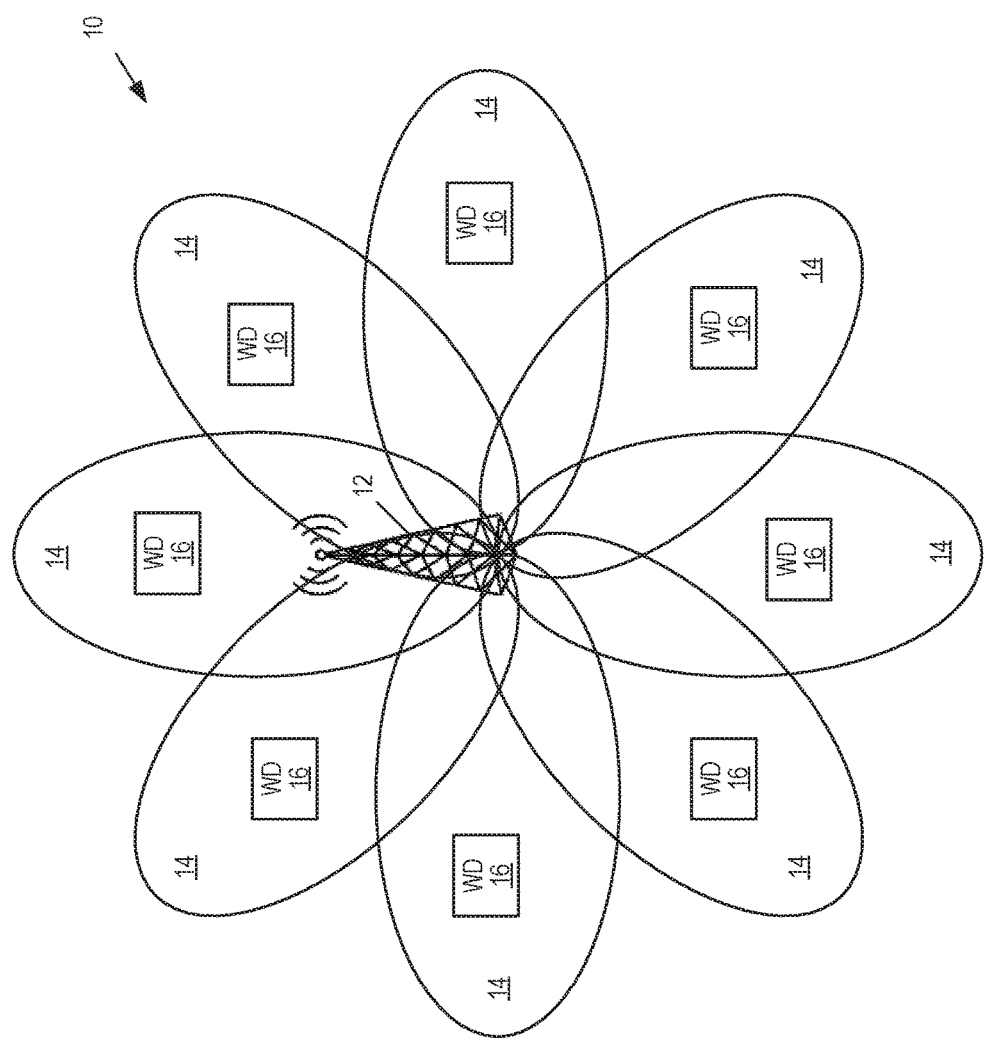
FIGS. 1A and 1B illustrate two examples of a base station in a cellular communications network that controls multiple cells and provides scheduling for the multiple cells according to some embodiments of the present disclosure.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Systems and methods for coordinated scheduling between cells in a cellular communications network are disclosed. In $3^{rd}$ Generation Partnership Project (3GPP) Long Term Evolution (LTE), starting with Release 8, explicit support for Inter-Cell Interference Coordination (ICIC) is provided. In particular, a set of messages are defined that can be exchanged between enhanced, or evolved, Node B (eNBs) using the X2 interface. For the uplink, the set of messages includes a High Interference Indicator (HII) and an Overload Indicator (OI). A first eNB controlling a first cell can send a HII to a second eNB controlling a second cell (i.e., a neighboring cell of the first cell) to provide information about a set of resource blocks within which the first eNB has high sensitivity to inter-cell interference. In response to the HII, the second eNB may, for example, avoid scheduling cell edge User Equipments (UEs) in the second cell on the set of resource blocks indicated by the HII. In contrast, the OI essentially operates to indicate the level of uplink interference experienced by the first cell on the different resource blocks of the first cell. Upon receiving the OI from the first eNB, the second eNB may then, for example, reduce transmissions on the resource blocks on which the first eNB is experiencing high uplink interference.

For the downlink, the set of messages defined by 3GPP LTE for ICIC includes a Relative Narrowband Transmit Power (RNTP) message. The RNTP message provides information for each resource block that indicates whether or not the relative transmit power of that resource block is to exceed a certain level. Thus, the first eNB may transmit a RNTP message to the second eNB to indicate to the second eNB the resource blocks on which the downlink of the first cell is to exceed a certain level. In response, the second eNB may, for example, avoid scheduling downlink transmissions to cell edge UEs in the second cell on the same resource blocks. In this manner, downlink inter-cell interference can be mitigated.

One problem with this conventional ICIC as defined in 3GPP LTE is that resource usage and transmit power level may change quickly (e.g., every Transmit Time Interval (TTI) or every few TTIs), which in turn causes channel quality fluctuations. Due to the limited bandwidth of the X2 interfaces, the conventional ICIC cannot operate at this speed. Furthermore, the promise to contain the average transmit power (e.g., as in the case of RNTP) may unnecessarily restrict radio resource usage and may negatively impact the Quality of Service (QoS) of the users.

The conventional ICIC defined by 3GPP LTE Release 8 focuses on ICIC between cells controlled by different eNBs by taking interference information into consideration during scheduling at the individual cell schedulers. However, there are some implementations in which a single eNB controls multiple cells. Conventionally, even if a single eNB controls multiple cells, each cell has its own individual cell scheduler.

One way to perform coordinated scheduling for multiple cells controlled by the same eNB is to perform centralized scheduling for all of the cells at the eNB. In centralized scheduling, all of the UEs connected to the cells controlled by the eNB are scheduled together in a centralized manner. The centralized scheduler could take into account the inter-cell interference experienced for each UE within the coverage of the eNB (i.e., the combined coverage area defined by all of the cells controlled by the eNB). Furthermore, the centralized scheduler could run fast enough to complete the centralized scheduling in one TTI. However, the problem with a centralized scheduler is that centralized scheduling for all Radio Access Bearers (RABs) for all UEs in all of the cells controlled by the eNB increases the complexity of the scheduling. For many UEs (e.g., the UEs for which little or no inter-cell interference is experienced), the centralized scheduling has little or no benefit and, as such, the complexity of the centralized scheduling for those UEs is undesirable.

Figure 1B:
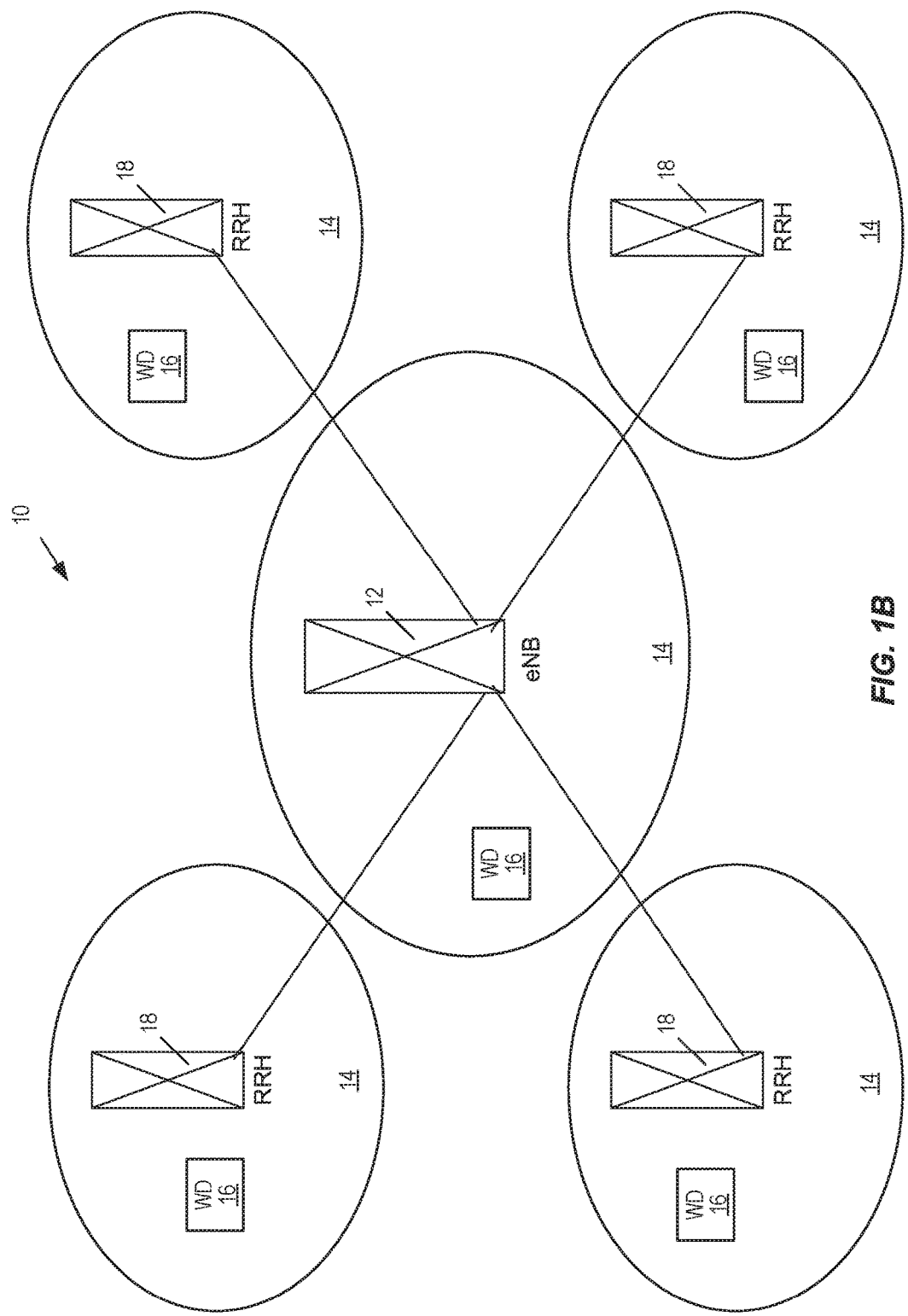

The present disclosure provides systems and methods for scheduling in a base station (e.g., an eNB) or other node controlling multiple cells using a combination of cluster, or centralized, scheduling for some RABs and individual cell scheduling for other RABs. Notably, as used herein, a cluster of cells controlled by a base station may include one or more cells of the base station (i.e., one or more cells provided by a radio unit(s) of the base station), one or more cells of one or more Remote Radio Heads (RRHs) controlled by the base station (i.e., one or more cells provided by RRHs controlled by the base station), and/or one or more cells of one or more other base stations controlled by the base station. In this regard, FIGS. 1A and 1B illustrate two examples of a cellular communications network 10 including a base station 12 controlling multiple cells 14, where the base station 12 (e.g., eNB) performs scheduling for the cells 14, according to some embodiments of the present disclosure. Notably, in some embodiments, the cellular communications network 10 is a 3GPP LTE network and, as such, 3GPP terminology is sometimes used. However, the present disclosure is not limited to 3GPP LTE and may be used in any suitable cellular communications network in which a base station or other node controls multiple cells.

As illustrated in FIG. 1A, the base station 12 controls a number of cells 14, which in this scenario may also be referred to as sectors. The cells 14 are referred to herein as a "cluster" of cells controlled by the base station 12. Wireless devices 16 (e.g., UEs) are connected to the cells 14. Conversely, in FIG. 1B, the base station 12 controls a number of cells 14, where transmission and reception for the cells 14 is provided by corresponding Remote Radio Heads (RRHs) 18. As discussed below, in either FIG. 1A or FIG. 1B, the base station 12 performs scheduling for the cells 14 using a combination of cluster, or centralized, scheduling and individual cell scheduling. As used herein, cluster, or centralized, scheduling is scheduling that is performed across all of the cells 14 in the cluster of cells 14 controlled by the base station 12. Via cluster scheduling, scheduling of radio resources between interfering cells within the cluster can be coordinated such that inter-cell interference, if any, is mitigated. In general, each wireless device 16 is connected to one of the cells 14 and transmits and receives via one or more RABs, as will be understood by one of ordinary skill in the art. Thus, each of the wireless devices 16 connected to a cell 14 has one or more corresponding RABs. The base station 12 operates to perform cluster, or centralized, scheduling for a first set of the RABs of the wireless devices 16 connected to the cells 14 and individual cell scheduling for a second set of RABs of the wireless devices 16 connected to the cells 14. For example, the first set of RABs are or include RABs for the wireless devices 16 that will benefit or benefit most from coordinated scheduling, whereas the second set of RABs are or include RABs for the wireless devices 16 that will not benefit or will benefit the least from coordinated scheduling.

In some embodiments, the base station 12 performs scheduling for the cells 14 by first selecting the wireless devices 16 which can be benefited by or that benefit the most from coordinated scheduling. Subsequently, the RABs of the selected wireless devices 16 are assigned radio resources by a cluster, or centralized, scheduler for all of the cells 14 controlled by the base station 12. For these RABs, cluster scheduling performs scheduling across all of the cells 14 in a coordinated manner. In some embodiments, the cluster scheduler assigns the radio resources by considering a global priority of the RABs, an expected channel quality, and available radio resources among all the cells 14 within the cluster. During this step, the priority of the RABs is kept intact. The channel quality for the RABs of the wireless devices 16 that are expected to obtain gain through cell coordination (via centralized scheduling) is taken into consideration when these RABs are prioritized for cluster scheduling. In some embodiments, other RABs that are not part of the cluster scheduling are scheduled by each serving cell independently in, for example, radio resources that are left unused after cluster scheduling.

Figure 2:
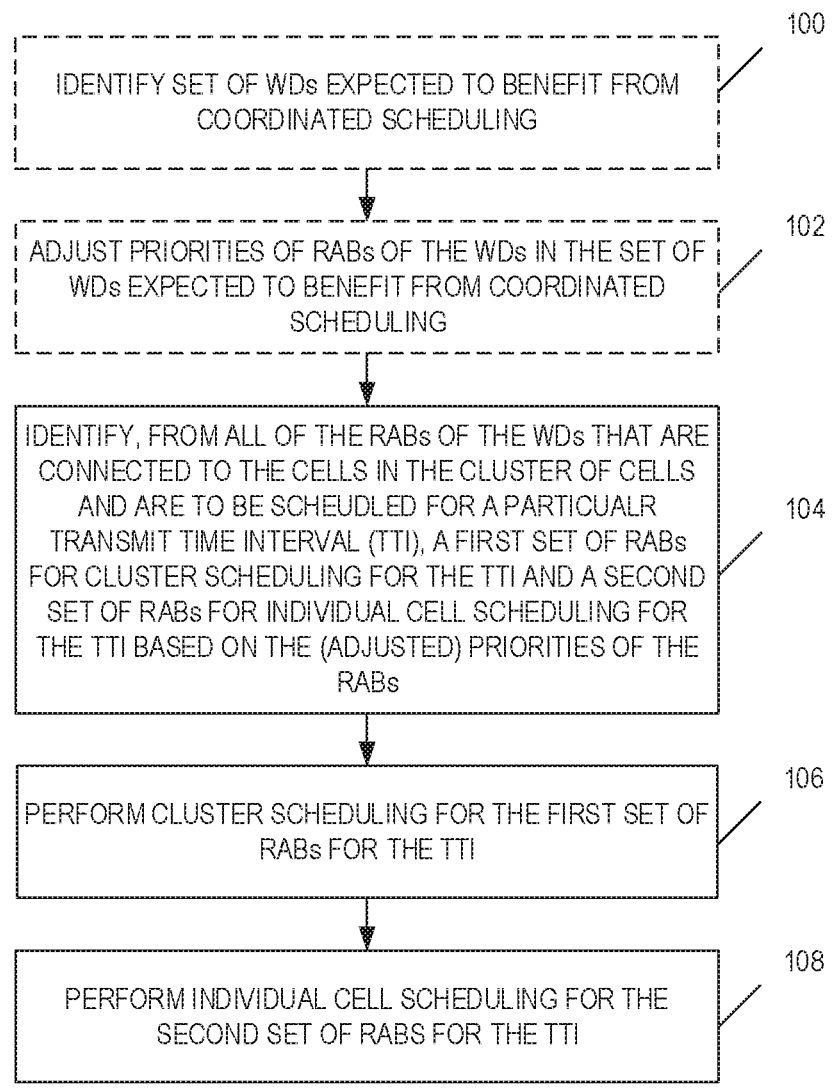
FIG. 2 is a flow chart that illustrates the operation of the base station of FIGS. 1A and 1B to provide scheduling according to some embodiments of the present disclosure.

FIG. 2 is a flow chart that illustrates the operation of the base station 12 of FIG. 1A or 1B to perform scheduling according to some embodiments of the present disclosure. As illustrated, optionally, in some embodiments, the base station 12 identifies a set of wireless devices 16 expected to benefit from coordinated scheduling (step 100). Any suitable technique may be used to identify, or selected, the set of wireless devices 16 that is expected to benefit from coordinated scheduling. As discussed below, in some embodiments, the base station 12 selects the set of wireless devices 16 from all wireless devices 16 connected to the cells 14 in the cluster controlled by the base station 12 based on one or more criteria. The one or more criteria may include, for example, expected performance gain if inter-cell interference from one or more dominant interfering cells is mitigated (i.e., if radio resource coordination, or coordinated scheduling, is used between the serving cell 14 of the wireless device 16 and the one or more dominant interfering cells 14 of the wireless device 16). More specifically, for a particular wireless device 16, the expected performance gain is an expected performance gain for the wireless device 16 if inter-cell interference for the wireless device 16 resulting from transmissions in one or more dominant interfering cells 14 (i.e., other cell(s) 14 in the cluster that cause the most inter-cell interference to the wireless device 16) is mitigated. If, for example, the performance gain for the wireless device 16 is greater than a defined threshold, then the wireless device 16 is selected, or identified, as one of the set of wireless devices 16 that is expected to benefit from coordinated scheduling. In another example, the one or more criteria may include, expected performance gain if one or more of the dominant interfering cells also transmit the same information as transmitted in the radio resources scheduled for the wireless device 16 in the serving cell 14 of the wireless device 16. The same information transmission from the interfering cells and the serving cell may comprise the actual data being encoded, modulated, and precoded in the same or a different manner from each cell. The encoding, modulation, and precoding of the information from each cell is coordinated such that the recovered data at the wireless device is free of errors. When the encoding, modulation, and precoding is coordinated among the transmissions from different cells, this transmission mode is referred to as coherent Coordinated Multipoint Transmission (CoMP). On the other hand, if the same encoding, modulation, and precoding is used at all cells, this transmission mode is referred as non-coherent CoMP.

Next, optionally, in some embodiments, priorities of the RABs of the wireless devices 16 in the set of wireless devices 16 identified in step 100 are adjusted (step 102). More specifically, the RABs of all of the wireless devices 16 are assigned some initial priority (e.g., a Priority Queue (PQ) weight) using any suitable RAB prioritization technique. This RAB prioritization technique is not the subject of the present application and, as such, the details of the RAB prioritization technique are not provided. However, it should be noted that one of ordinary skill in the art will readily understand that there are conventional RAB prioritization techniques used to, e.g., provide different QoS levels to different RABs. In step 102, the initial priorities of the RABs of the wireless devices 16 in the set of wireless devices 16 expected to benefit from coordinated scheduling are adjusted. Preferably, the priorities of these RABs are adjusted by increasing the priorities of these RABs according to, for example, the amount of expected performance gain of the corresponding wireless devices 16. For example, in a Proportional Fair (PF) criterion based radio resource scheduling, (a) the rate of information in a given transmission and (b) the rate at which the information has been transmitted in the past decide the number of radio resource units a mobile device can be assigned. Therefore, if the wireless device 16 is expected to get a better channel quality, i.e. better signal to interference plus noise ratio because of the cell coordination, that should be counted in assigning the radio resources. Similarly, in delay based radio resource scheduling the expected packet errors because of the possibility of retransmission (which again depends on the channel quality) should be considered in assigning the radio resources. In general, the expected channel quality improvement due to the cell coordination should be considered in assigning the radio resources, i.e., the number of radio resources, the specific radio resources in a pool of available radio resources, the transmit power, and the modulation and coding schemes. Optimizing all these parameters based on an expected user experience or QoS improves the better the utilization of the radio resources.

The base station 12 identifies a first set of RABs for cluster scheduling for a TTI and a second set of RABs for individual cell scheduling for the same TTI based on the (adjusted) priorities of the RABs (step 104). As used herein, cluster scheduling is scheduling at the cluster level (i.e., centralized scheduling for all of the cells 14 in the cluster controlled by the base station 12) rather than at the individual cell level. Further, the first and second sets of RABs are disjoint or non-overlapping sets of RABs. More specifically, the base station 12 identifies the first and second sets of RABs from the RABs of the wireless devices 16 that are: (a) connected to the cells 14 in the cluster of cells 14 controlled by the base station 12 and (b) to be scheduled in the TTI (e.g., have Physical Downlink Control Channel (PDCCH) in the TTI). The RABs of the wireless devices 16 that are connected to the cells 14 in the cluster and are to be scheduled in the TTI include one or more of the RABs of the wireless devices 16 in the set identified in step 100 unless, of course, none of those wireless devices 16 are to be scheduled in this TTI. However, for this discussion, it is assumed that at least one of the wireless devices 16 in the set of wireless devices 16 identified in step 100 is to be scheduled in this TTI.

In some embodiments, the first set of RABs consists of the RABs having priorities greater than or equal to a defined threshold. The defined threshold may, in some embodiments, be dynamically defined such that the number of RABs in the first set of RABs is less than a predefined maximum number of RABs for cluster scheduling. Conversely, the second set of RABs consists of the remaining RABs (i.e., the RABs having priorities less than the defined threshold).

The base station 12 then performs cluster scheduling for the first set of RABs for the TTI (step 106). More specifically, for each RAB in the first set of RABs, the base station 12 selects radio resources for that RAB in the serving cell 14 of the corresponding wireless device 16. In some embodiments, for each RAB in the first set of RABs, if the corresponding wireless device 16 has one or more dominant interfering cells 14, the same radio resources scheduled for the RAB (in the serving cell 14 of the wireless device 16) are flagged as reserved for at least one of the other cells 14 in the cluster that are identified as dominant interfering cells to that wireless device 16. The radio resources flagged as reserved are either not used in the dominant interfering cell(s) 14, are not used for high power transmissions (e.g., transmissions to/from cell edge wireless devices 16) in the dominant interfering cell(s) 14, or used for transmission of the same information as that transmitted in the corresponding radio resources in the serving cell 14 of the wireless device 16. In this manner, radio resource coordination, or coordinated scheduling, is provided. Notably, the interfering cells 14 for which coordination is provided are also referred to herein as coordinated cells. Also, not all RABs in the first set of RABs may correspond to wireless devices 16 having dominant interfering cell(s) 14. For any such RABs, the radio resources scheduled for those RABs are not marked as reserved in any of the other cells 14 in the cluster since the corresponding wireless devices 16 would not benefit, or would not substantially benefit, from coordinated scheduling.

The base station 12 performs individual cell scheduling for the second set of RABs for the TTI (step 108). More specifically, each RAB in the second set of RABs is scheduled by the individual cell scheduler of the serving cell 14 of the corresponding wireless device 16. However, in some embodiments, the individual cell schedulers take into account reserved resources flagged, or indicated by, the cluster scheduler in order to mitigate inter-cell interference.

Figure 3A:
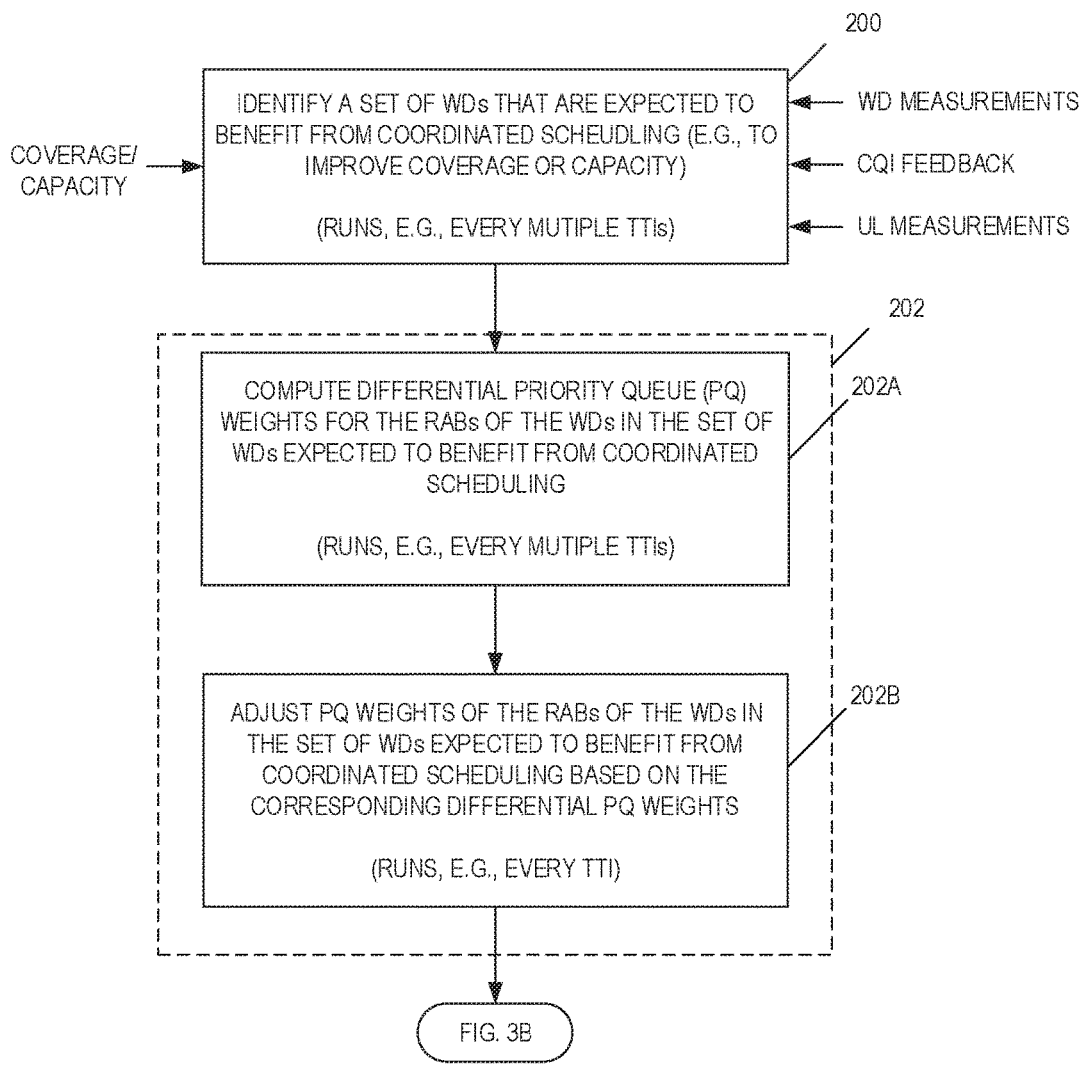
FIGS. 3A and 3B illustrate the process of FIG. 2 in more detail according to some embodiments of the present disclosure.
Figure 3B:
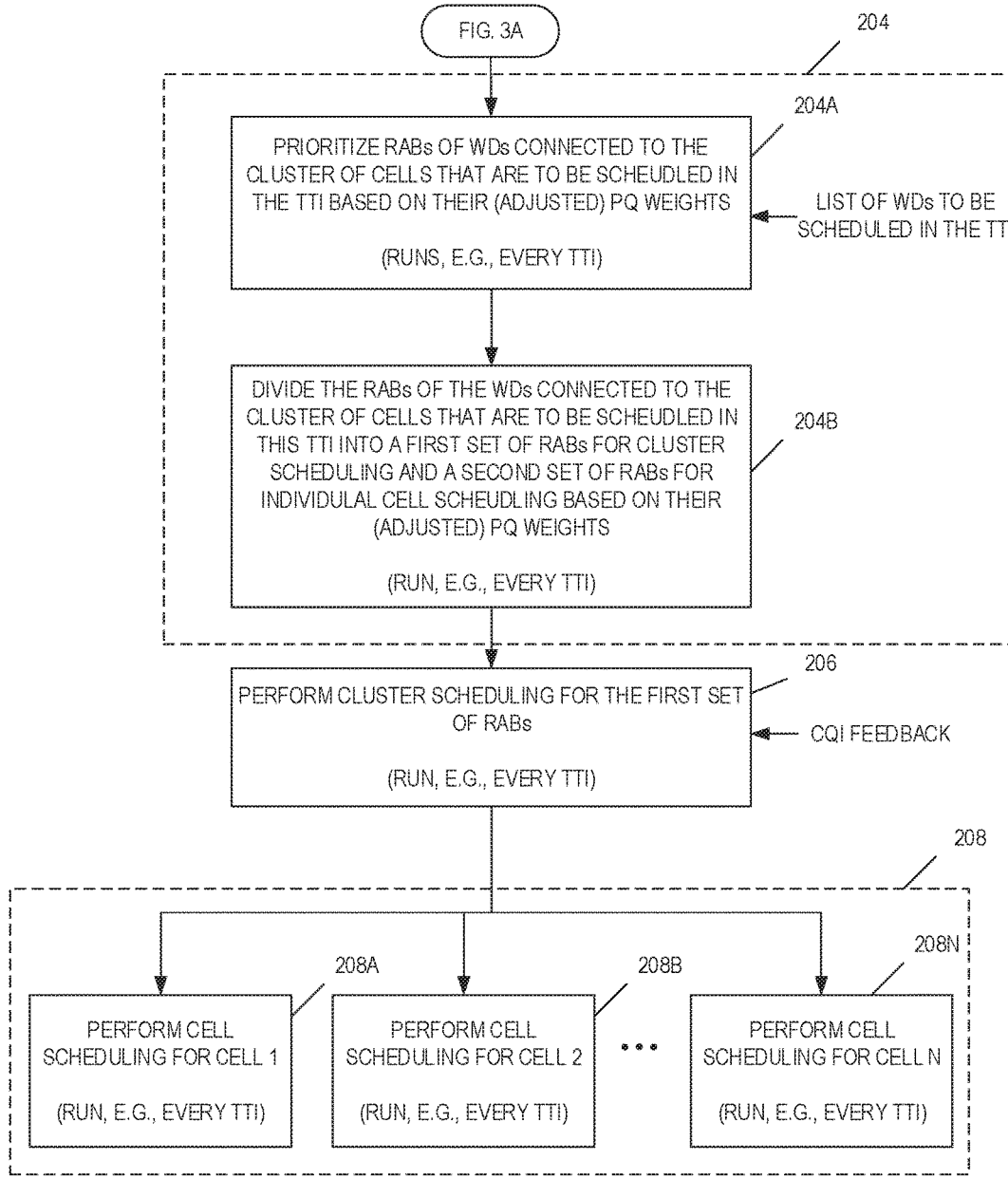

FIGS. 3A and 3B are a flow chart that illustrates the process of FIG. 2 in more detail according to some embodiments of the present disclosure. Note that steps 200-208 substantially correspond to steps 100-108 of FIG. 2. As illustrated, the base station 12 identifies a set of wireless devices 16 expected to benefit from coordinated scheduling (step 200). This step is performed, for example, every multiple or few TTIs (e.g., every two TTIs, every three TTIs, every four TTIs, etc.). Again, any suitable technique may be used to identify, or select, the set of wireless devices 16 that are expected to benefit from coordinated scheduling. The set of wireless devices 16 that are expected to benefit from coordinated scheduling may be identified, or selected, based on, for example, measurements received from the wireless devices 16, Channel Quality Indication (CQI) feedback from the wireless devices 16, and/or uplink measurements made by the base station 12. As discussed below, in some embodiments, the base station 12 selects the set of wireless devices 16 from all wireless devices 16 connected to the cells 14 in the cluster of cells 14 controlled by the base station 12 based on one or more criteria. These one or more criteria may relate to improved coverage or capacity of the cluster of cells 14. As discussed above, in some embodiments, the one or more criteria may include, for example, expected performance gain if inter-cell interference from one or more dominant interfering cells is mitigated.

More specifically, the wireless devices 16 connected to the cells 14 in the cluster of cells 14 controlled by the base station 12 are segregated into two groups from information provided by each of the cells 14. More specifically, in some embodiments, the wireless devices 16 that can obtain significant gain in Signal-to-Interference-Plus-Noise Ratio (SINR) by suppressing the intra-base-station-cell-interferers (i.e., the dominant inter-cell interferers originating from other cells 14 in the cluster of cells 14 controlled by the base station 12) are identified by triggering and collecting measurement reports from the wireless devices 16. In other embodiments, each of the individual cells 14 within the cluster of cells 14 measures transmissions, e.g., Sounding Reference Signals (SRSs), from all of the wireless devices 16 connected to the cells 14 in the cluster of cells 14 (which may be referred to herein as intra-base-station wireless devices or intra-eNB UEs). The uplink measurements can be performed by exchanging, for example, SRS configuration among the cells 14 in the cluster of cells 14. From these measurement reports from the wireless devices 16 and/or uplink measurements made by the base station 12 for the cells 14, the dominant interferer(s) for each of the wireless devices 16 is identified, and the set of wireless devices 16 that are expected to benefit, or benefit the most, from coordinated scheduling are identified. Note that the number of wireless devices 16 in the set of wireless devices 16 identified in step 200 may be limited to some predefined maximum number (e.g., some limit for implementation purposes).

In some particular embodiments, the wireless devices 16 report measurement results such as Reference Signal Received Power (RSRP) and/or Reference Signal Received Quality (RSRQ) when a network-defined event occurs. For example, each of the wireless devices 16 may be configured to report RSRP and/or RSRQ with respect to the serving cell 14 of the wireless device 16 and all of the neighboring cells 14 of the wireless device 16 in response to an A3 event, i.e., an event where the RSRP with respect to one of the neighboring cells 14 of the wireless device 16 is better than the RSRP with respect to the serving cell 14 of the wireless device 16 by a predefined threshold amount. Such measurement reports can be used to identify the dominant interfering cells for the wireless devices 16. Further, the performance gains for the wireless devices 16 if the transmission from the dominant interferers of the wireless devices 16 are mitigated, or controlled, can also be estimated. For example, in some embodiments, the performance gain is a downlink SINR gain ($\Delta$). For a particular wireless device 16, the downlink SINR gain ($\Delta$) for the wireless device 16 if the dominant interferer(s) of the wireless device 16 are mitigated, or suppressed, can be estimated as:

$$\gamma^e = \gamma + \Delta$$

$$\Delta = -10 \log_{10}(1-\beta)$$

where $$\beta = \frac{R_\ell}{\sum_{i=1}^{N} R_i + N_0}$$

and $R_i$ is the RSRP with respect to the ith cell 14. N represents the number of neighbor cells. Cell-0 and Cell-1 are the serving cell and dominant interfering cell for the wireless device 16, respectively. $N_0$ is the noise power spectral density. $\gamma^e$ and $\gamma$ are the SINR with and without suppressing the dominant interference from a neighbor cell, respectively. $\gamma$ and $\gamma^e$ can be expressed as follows:

$$\gamma = 10 \log_{10}\left(\frac{R_0}{\sum_{i=1}^{N} R_i + N_0}\right)$$

$$\gamma^e = 10 \log_{10}\left(\frac{R_0}{\sum_{i=1}^{N} R_i + N_0 - R_\ell}\right)$$

For the case where the same information is transmitted from the interfering cells also, $\gamma^e$ can be expressed as follows:

$$\gamma^e = 10 \log_{10}\left(\frac{R_0 + R_\ell}{\sum_{i=1}^{N} R_i + N_0 - R_\ell}\right)$$

A similar expression for gain $\Delta$ can be derived for this case.

For each wireless device 16, the wireless device 16 can be identified as one of the set of wireless devices 16 expected to benefit from coordinated scheduling if the downlink SINR gain (Δ) for the wireless device 16 is greater than a predefined threshold. This predefined threshold may or may not be the same for all wireless devices 16. In some embodiments, this predefined threshold is a system parameter and can be, for example, a function of the number of dominant interfering cells for the wireless device 16. As used herein, a dominant interfering cell is a cell 14 in the cluster of cells 14 from which inter-cell interference (i.e., the dominant interferer(s)) to the wireless device 16 originates and is greater than a predefined threshold.

Next, optionally, in some embodiments, priorities of the RABs of the wireless devices 16 in the set of wireless devices 16 identified in step 200 are adjusted (step 202). More specifically, in this embodiment, the RABs of all of the wireless devices 16 are assigned corresponding initial PQ weights using any suitable PQ weighting technique. The base station 12 computes a differential PQ weight for each of the RABs of the wireless devices 16 in the set of wireless devices 16 expected to benefit from coordinated scheduling (step 202A). The differential PQ weights may be computed every few or multiple TTIs. More specifically, the differential PQ weight for the ith RAB for the jth TTI may be computed as follows. The initial PQ weight for the ith RAB may first be computed as:

$$w_{i,j} = \frac{v_{i,j}}{V_{i,j-1}}$$

where $v_{i,j}$ is the expected throughput for the ith RAB if some of the radio resources are assigned for the ith RAB in the jth TTI and $V_{i,j-1}$ is the accumulated throughput of for the ith RAB till the (j−1)th TTI. Thus, $$V_{i,j-1} = \frac{\sum_{k=0}^{j-1} v_{i,k}\lambda_{i,k}}{(j-1)T_S},$$

where $\lambda_{i,k}=1$ if the ith PQ is scheduled during the kth TTI and $T_s$ is the TTI duration in seconds. The differential weight ($\Delta w_{i,j}$) for the ith RAB for cluster scheduling can then be computed as:

$$\Delta w_{i,j} = \tilde{v}_{i,j}/v_{i,j}$$

where $\tilde{v}_{i,j}=f(\gamma_{i,j}^e)$ and $v_{i,j}=f(\gamma_{i,j})$, and $\gamma_{i,j}$ and $\gamma_{i,j}^e$ are the SINR with and without radio resource coordination among the cells. In another example, $\tilde{v}_{i,j}=f(\gamma_{i,j}^e)/m$ and $v_{i,j}=f(\gamma_{i,j})$, where m can be adjusted to account for the corresponding radio resources that are tagged in the interfering cells. For example, m can be set to ≤2 if the corresponding resources in one interfering cell are muted or unused for data transmission. Alternatively, a similar weight modifier can also be computed for delay sensitive RABs.

The base station 12 adjusts the PQ weights of the RABs of the wireless devices 16 in the set of wireless devices 16 expected to benefit from coordinated scheduling based on the corresponding differential PQ weights ($\Delta w_{i,j}$) (step 202B). In some embodiments, this step is performed every TTI since the PQ weights of the RABs are updated every TTI. In some embodiments, the base station 12 adjusts the PQ weights of the RABs by summing the initial PQ weights ($w_{i,j}$) and the corresponding differential PQ weights ($\Delta w_{i,j}$) to provide the adjusted PQ weights.

Next, based on the (adjusted) PQ weights of the RABs of the wireless devices 16 to be scheduled for a TTI, the base station 12 identifies a first set of RABs for cluster scheduling for the TTI and a second set of RABs for individual cell scheduling for the same TTI (step 204). More specifically, in this embodiment, the base station 12 prioritizes all of the RABs of the wireless devices 16 that are: (a) connected to the cells 14 in the cluster of cells 14 controlled by the base station 12 and (b) to be scheduled in the TTI. The RABs are prioritized according to their (adjusted) PQ weights. This prioritization of the RABs is referred to herein as global prioritization of the RABs. In some embodiments, the prioritization of the RABs results in a list of RABs to be scheduled in a particular TTI ordered according to the PQ weights of the RABs. This prioritization is performed each TTI. As such, in some embodiments, an ordered list of RABs is generated for each TTI.

The base station 12 then divides the RABs of the wireless devices 16 that are connected to the cells 14 in the cluster of cells 14 and are to be scheduled in the TTI into a first set of RABs for cluster scheduling and a second set of RABs for individual cell scheduling based on the (adjusted) PQ weights of the RABs (step 204B). More specifically, in some embodiments, step 204A results in an ordered list of RABs, where the RABs are ordered according to their (adjusted) PQ weights. The ordered list of RABs is then divided based on a defined PQ weight threshold such that the RABs in the list that are at or above the defined threshold form the first set of RABs for cluster scheduling and the remaining RABs form the second set of RABs for individual cell scheduling. In some embodiments, the defined threshold is equal to the lowest adjusted PQ weight of the any of the wireless devices 16 in the set identified in step 200 that are to be scheduled in this TTI. In other embodiments, the defined threshold is equal to the lowest adjusted PQ weight of the any of the wireless devices 16 in the set identified in step 200 that are to be scheduled in this TTI that limits the number of RABs in the first set of RABs to some predefined maximum number of RABs for cluster scheduling.

The base station 12 then performs cluster scheduling for the first set of RABs for the TTI (step 206). More specifically, available radio resources are scheduled for the RABs in the first set of RABs according to the PQ weights of the RABs. So, the RAB in the first set having the highest PQ weights is scheduled first, the RAB in the first set having the second highest PQ weight is scheduled second, and so on. For each RAB in the first set for which coordination is desired (i.e., for each RAB in the first set that is a RAB for a wireless device 16 in the set of wireless devices 16 identified in step 200 as expected to benefit from coordinated scheduling), the base station 12 flags, or tags, the corresponding radio resources in the dominant interfering cell(s) 14 as reserved (e.g., muted or reduced transmit power radio resources in the dominant interfering cell(s) 14 or radio resources for transmission of the same information as that transmitted in the corresponding radio resources in the serving cell 14 of the wireless device 16). For the other RABs in the first set of RABs, the same radio resources scheduled for the RABs in the serving cells 14 of the corresponding wireless devices 16 can be reused in the neighboring cells 14 since there is little or no benefit for coordinated scheduling (e.g., no dominant interfering cells 14) for those wireless devices 16.

The base station 12 performs individual cell scheduling for the second set of RABs for the TTI (step 208). In particular, the base station 12 includes separate individual cell schedulers for each of the cells 14 that perform individual cell scheduling for the RABs of the wireless devices 16 connected to those cells (steps 208A through 208N). Thus, for each of the RABs in the second set of RABs, the individual cell scheduler for the serving cell 14 of the corresponding wireless device 16 schedules available radio resources in the serving cell 14 for the RAB. The individual cell scheduler takes into account any reserved radio resources in the second cell such that, depending on the embodiment, no RABs are scheduled in the reserved radio resources or only RABs for low power transmissions (e.g., transmissions for RABs of non-cell-edge wireless devices 16) are scheduled in the reserved radio resources.

Figure 4:
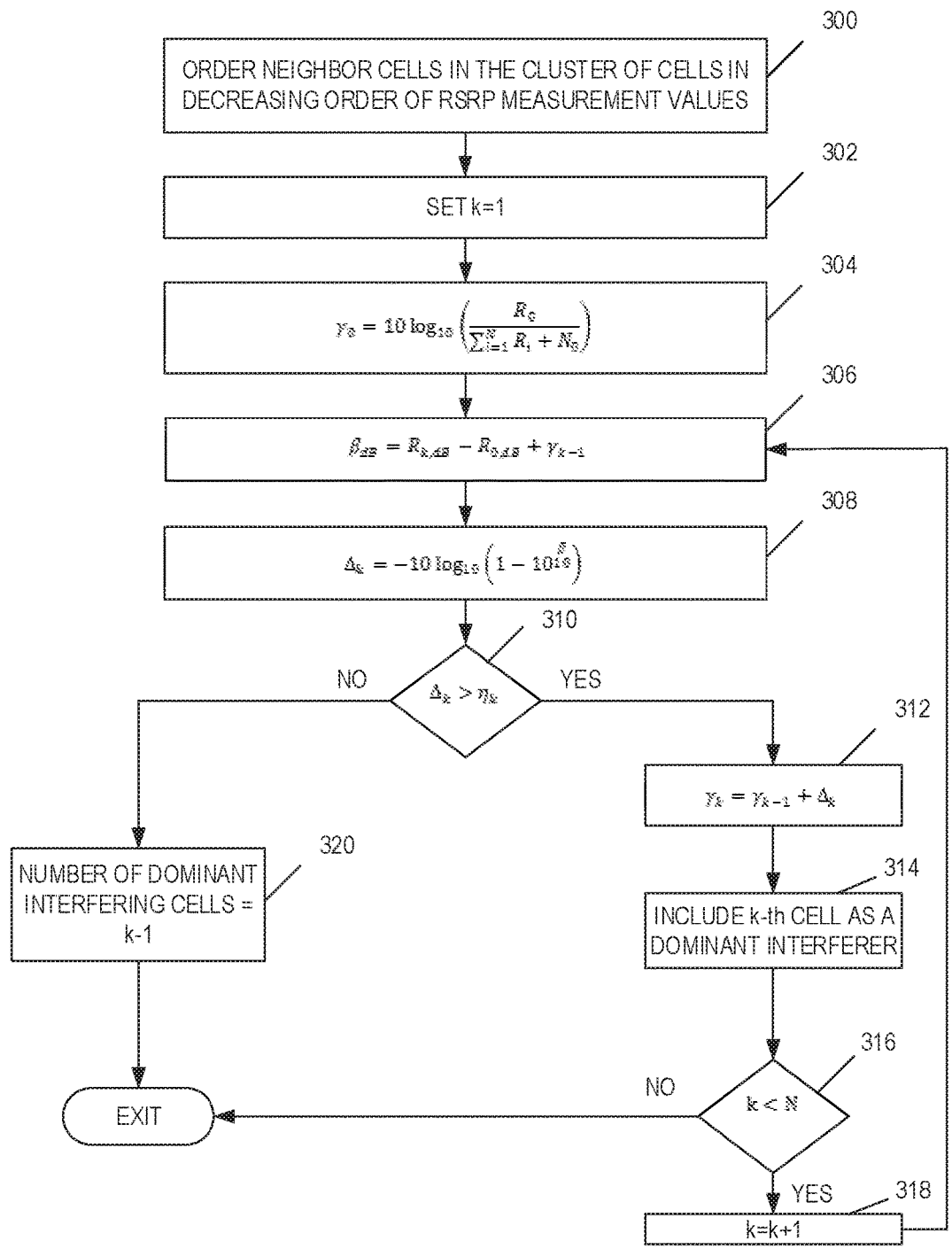
FIG. 4 illustrates the step of identifying a set of wireless devices that are expected to benefit from coordinated scheduling from the processes of FIG. 2 and FIGS. 3A and 3B according to some embodiments of the present disclosure.

FIG. 4 is a flow chart that illustrates a process for identifying, or selecting, the set of wireless devices 16 that are expected to benefit from coordinated scheduling according to some embodiments of the present disclosure. This process also identifies the dominant interfering cell(s) 14 for the wireless devices 16 in the set. In particular, the process of FIG. 4 is shown with respect to a single wireless device 16. The process is repeated or performed in parallel for the other wireless devices 16. In some embodiments, this process may be performed for the wireless devices 16 connected to the cells 14 in the cluster of cells 14 controlled by the base station 12 in order to identify the set of wireless devices 16 expected to benefit from coordinated scheduling according to steps 100 and 200 of FIGS. 2 and 3A, respectively.

As illustrated, the neighboring cells 14 for the wireless device 16 are ordered in decreasing order of RSRP measurement values reported by the wireless device 16 (step 300). An index (k) is initially set to 1 (step 302). The base station 12 computes an average SINR ($\gamma_0$) as (expressed in decibels):

$$\gamma_0 = 10\log_{10}\left(\frac{R_0}{\sum_{i=1}^{N} R_i + N_0}\right)$$

where $R_0$ is the RSRP measurement for Cell-0 (i.e., the serving cell 14 of the wireless device 16), $R_i$ is the RSRP measurement for the ith neighboring cell 14 of the wireless device 16, and $N_0$ is the noise power spectral density (step 304).

The base station 12 then performs an iterative process to both determine whether the wireless device 16 is expected to benefit from coordinated scheduling and, if so, identify the dominant interfering cell(s) 14 for the wireless device 16. Specifically, the base station 12 iteratively determines, for each neighboring cell 14 in the ordered list of neighboring cells 14 of the wireless device 16, whether the gain ($\Delta$) in average SINR for the wireless device 16 (assuming that interfering transmissions from the neighboring cell 14 are suppressed) is greater than a defined threshold. If so, the neighbor cell 14 is identified as a dominant interfering cell 14 of the wireless device 16, and the wireless device 16 is identified as one of the set of wireless devices 16 expected to benefit from coordinated scheduling.

More specifically, as illustrated, the base station 12 computes a value $\beta_{dB}$ for the kth neighboring cell 14 as:

$$\beta_{dB} = R_{k,dB} - R_{0,dB} + \gamma_{k-1}$$

where $R_{k,dB}$ is the RSRP measured by the wireless device 16 for the kth neighboring cell 14 in decibels, $R_{0,dB}$ is the RSRP measured by the wireless device 16 for the serving cell 14 of the wireless device 16 in decibels, and $\gamma_{k-1}$ is the average SINR expressed in decibels for the k−1th cell 14 (i.e., for the first iteration where k=1, $\gamma_{k-1}=\gamma_0$) (step 306).

The base station 12 then computes the gain ($\Delta_k$) in average SINR for the wireless device 16 assuming that inter-cell interference from the kth neighboring cell 14 is suppressed (e.g., no transmissions in the kth neighboring cell 14 using the same radio resources or no high power transmission in the kth neighboring cell 14 using the same radio resources) (step 308). Specifically, the base station 12 computes the gain ($\Delta_k$) in average SINR for the wireless device 16 assuming that inter-cell interference from the kth neighboring cell 14 is suppressed as:

$$\Delta_k = -10\log_{10}\left(1 - 10^{\frac{\beta_{dB}}{10}}\right).$$

The base station 12 then compares the gain ($\Delta_k$) to a predefined threshold $\eta_k$ (step 310). The predefined threshold $\eta_k$ is, in some embodiments, a system parameter. In some embodiments, the predefined threshold $\eta_k$ is a function of the number of dominant interfering cells that have been identified for the wireless device 16 up to this point in the iterative process (i.e., $\eta_k$ may be a function of k).

If the gain ($\Delta_k$) is greater than the predefined threshold $\eta_k$, the base station 12 computes an average SINR ($\gamma_k$) assuming that the inter-cell interference from the kth neighboring cell 14 is suppressed as $\gamma_k = \gamma_{k-1} + \Delta_k$ (step 312). The kth neighbor cell 14 is identified as a dominant interfering cell 14 for the wireless device 16 (step 314). The base station 12 then determines whether k is less than N, where here N is the number of neighbor cells 14 in the ordered list of neighbor cells 14 for the wireless device 16 (step 316). If so, the base station 12 increments the index k (step 318), and the process returns to step 306 and is repeated. Otherwise, the process is complete.

Returning to step 310, if the gain ($\Delta_k$) is not greater than the predefined threshold $\eta_k$, the kth neighboring cell 14 is not a dominant interferer for the wireless device 16. Since the list of neighboring cells 14 is ordered in this example, the base station 12 therefore knows that none of the remaining neighboring cells 14 are dominant interfering cells 14 for the wireless device 16. At this point, the base station 12 sets the number of dominant interfering cells 14 for the wireless device to k−1 (step 320), and the process is then complete.

Figure 5:
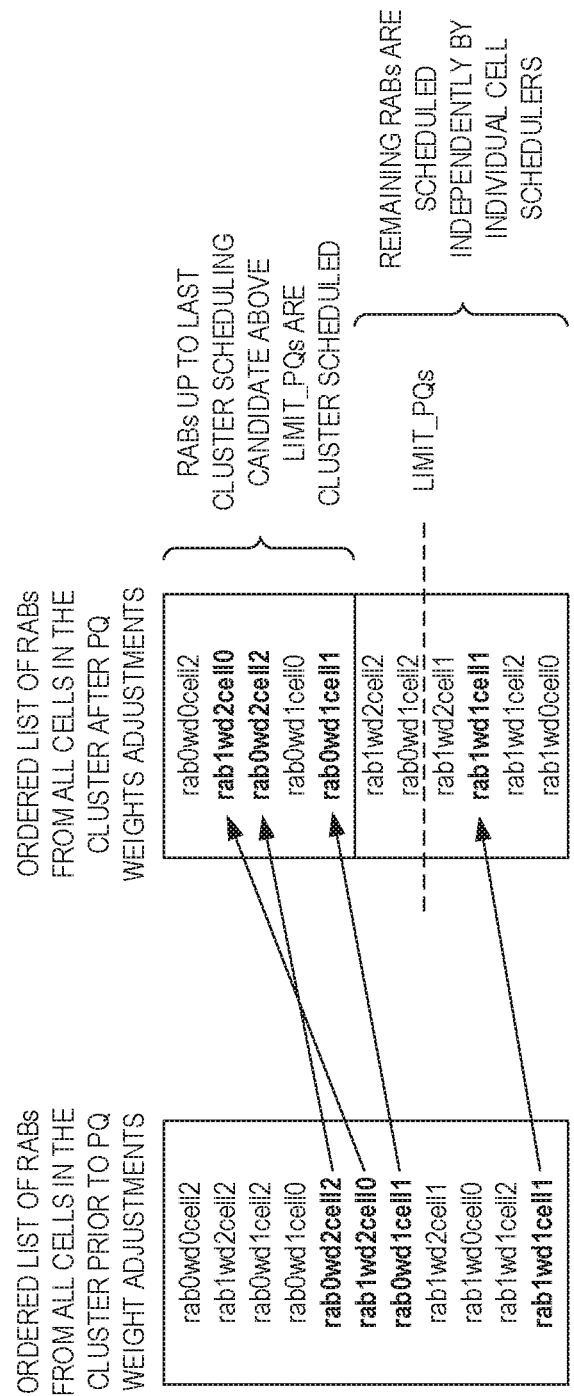
FIG. 5 graphically illustrates the division of an ordered list of Radio Access Bearers (RABs) into a first set of RABs for cluster scheduling and a second set of RABs for individual cell scheduling according to some embodiments of the present disclosure.

FIG. 5 graphically illustrates one example of steps 202 and 204 of FIGS. 3A and 3B according to some embodiments of the present disclosure. As illustrated, an initial list of RABs for the wireless devices 16 that are connected to the cells 14 in the cluster of cells 14 and are to be scheduled in this particular TTI are ordered according to their respective PQ weights. The PQ weights of the RABs of the wireless devices 16 in the set of wireless devices 16 identified as being expected to benefit from coordinated scheduling are then adjusted. In this particular example, the wireless devices 16 referenced as WD2 in Cell2, WD2 in Cell0, and WD1 in Cell1 are in the set of wireless devices 16 expected to benefit from coordinated scheduling. As such, the PQ weights of the corresponding RABs are adjusted by, in this example, increasing the PQ weights of those RABs. Then, the ordered list of RABs after adjusting the PQ weights is divided based on a defined PQ weight threshold. In this example, the PQ weight threshold is the lowest PQ weight of any of WD2 in Cell2, WD2 in Cell0, and WD1 in Cell1 that keeps the number of RABs in the first set of RABs for cluster scheduling less than a predefined limit LIMIT_PQs.

In other words, the RABs of the WD2 in Cell2, WD2 in Cell0, and WD1 in Cell1 are referred to herein as "cluster scheduling candidates," and the defined threshold for dividing the ordered list of RABs with the adjusted weights into the first set of RABs for cluster scheduling and the second set of RABs for individual scheduling is the lowest PQ weight of any of the cluster scheduling candidates that keeps the number of RABs in the first set of RABs less than the limit (LIMIT_PQs). In this manner, the first and second sets of RABs are defined.

Figure 6:
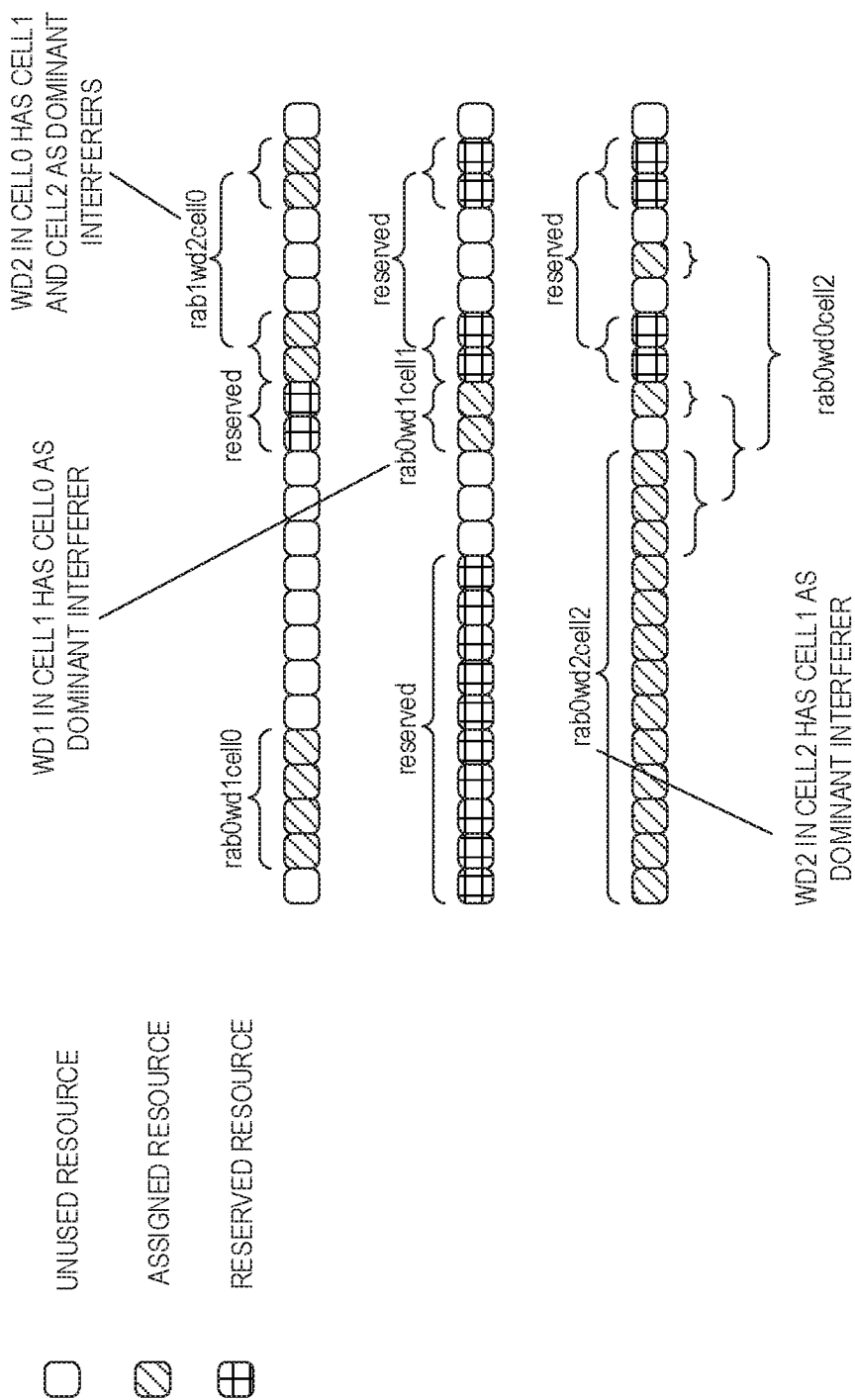
FIG. 6 graphically illustrates one example of scheduling between a number of cells controlled by the base station in which radio resources scheduled for a RAB in one cell during cluster scheduling are reserved in one or more dominant interfering cells in order to mitigate inter-cell interference according to some embodiments of the present disclosure.

FIG. 6 illustrates one example of the cluster scheduling of the first set of RABs from FIG. 5 according to some embodiments of the present disclosure. In this example, the RAB in the first set of RABs with the highest priority (highest PQ weight), i.e., rab0wd0cell2, is scheduled first with the best radio resources for wd0. Next, the RAB in the first set of RABs with the second highest priority, i.e., rab1wd2cell0, is scheduled second. In this example, wd2 in cell0 is one of the wireless devices 16 in the set of wireless devices 16 expected to benefit from coordinated scheduling and therefore has at least one dominant interfering cell 14, which in this example are cell1 and cell2. As such, the best or appropriate radio resources in cell0 are scheduled for rab1wd2cell0 and the corresponding radio resources in the dominant interfering cells, i.e., cell1 and cell2, are tagged as reserved. The reserved radio resources in cell1 and cell2 are either muted or used for low power transmissions in order to suppress inter-cell interference to wd2 in cell0. The procedure continues until the last RAB in the first set of RABs is scheduled.

Figure 7A:
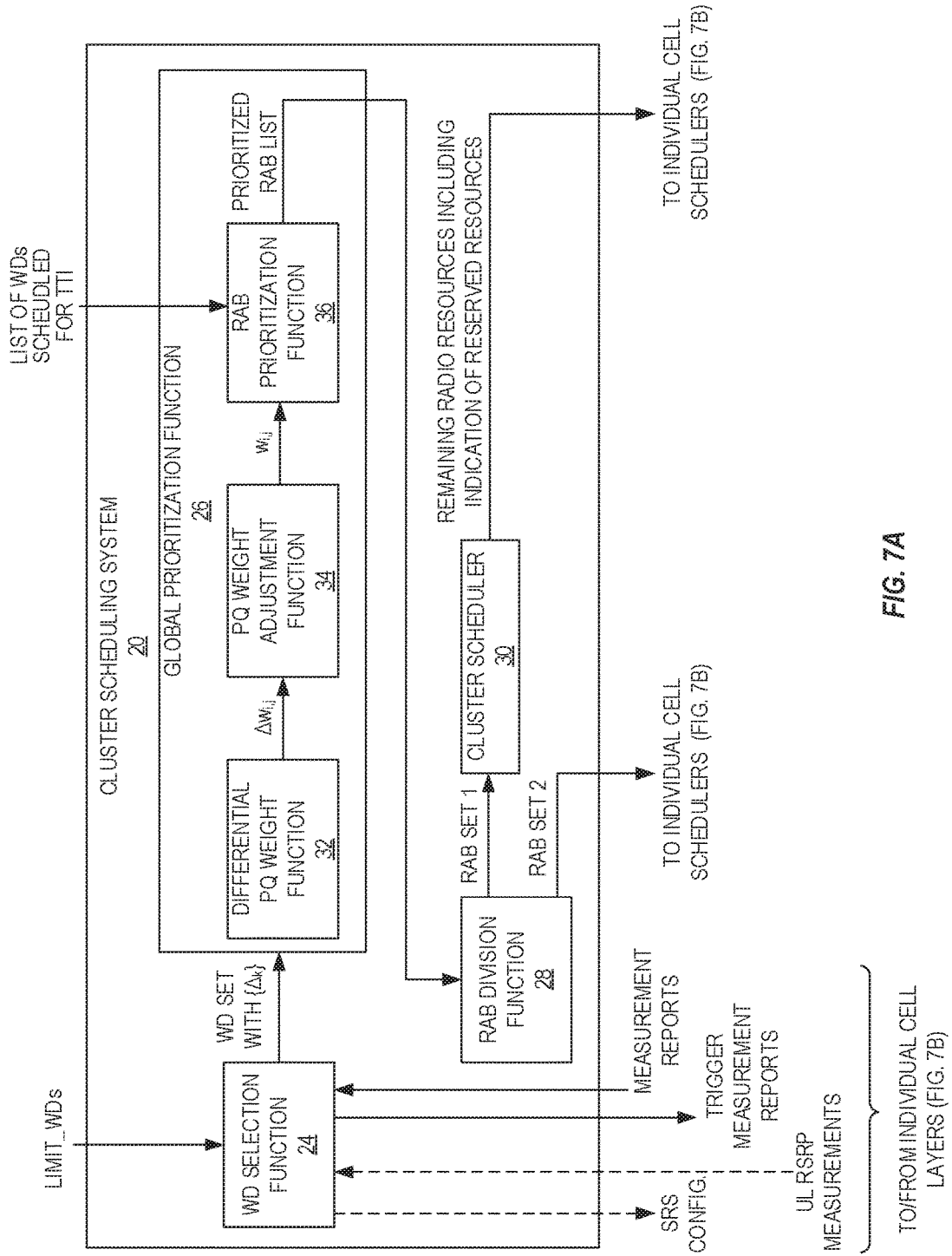
FIGS. 7A and 7B illustrate a block diagram of a scheduling system of the base station of FIGS. 1A and 1B according to some embodiments of the present disclosure.
Figure 7B:
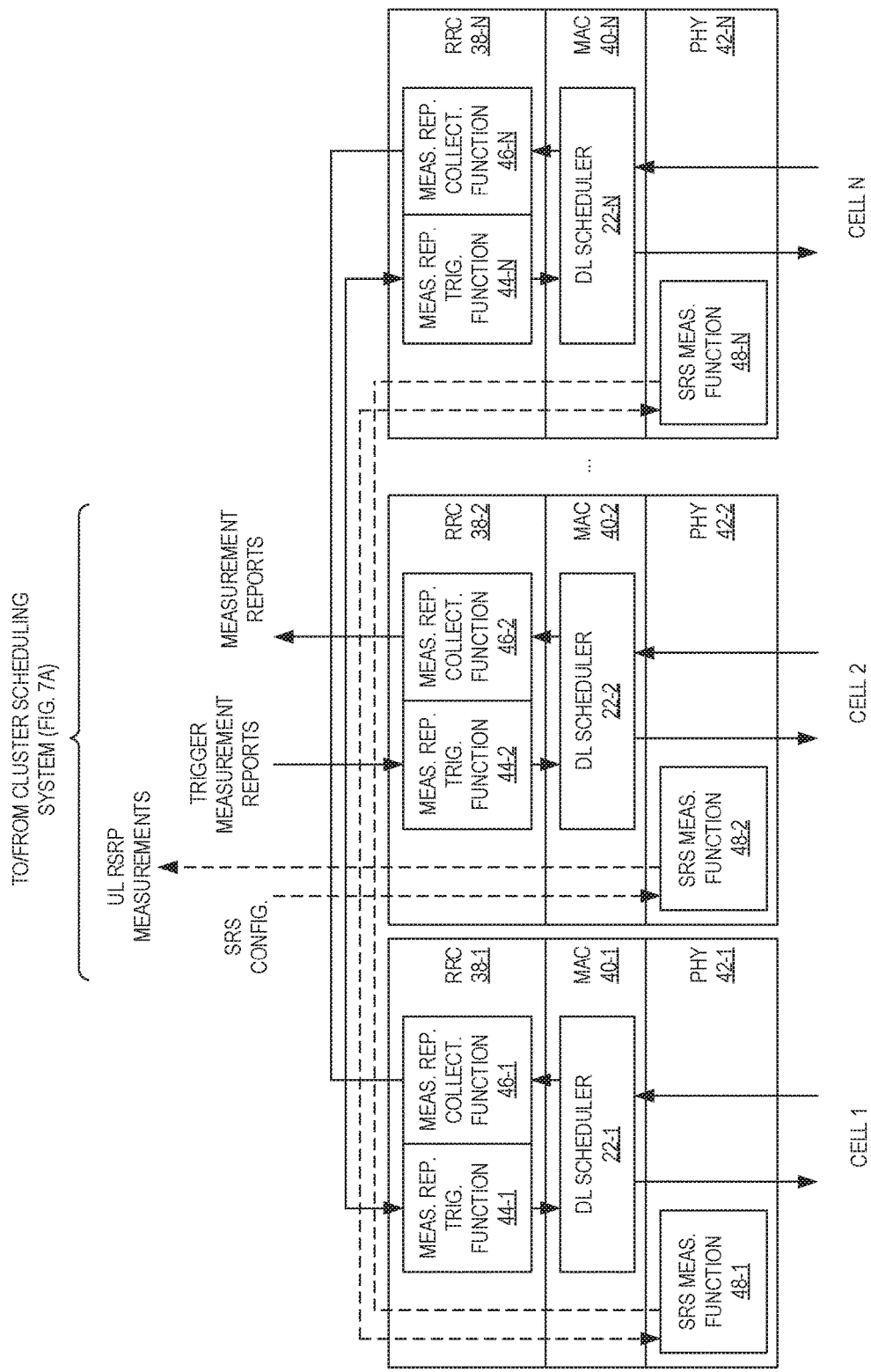

FIGS. 7A and 7B illustrate a block diagram of the base station 12 of FIGS. 1A and 1B according to some embodiments of the present disclosure. It should be noted that FIGS. 7A and 7B focus on a cluster scheduling system 20 and individual cell schedulers 22-1 through 22-N (where here N is the number of cells 14 in the cluster of cells 14 controlled by the base station 12). However, as will be readily appreciated by one of ordinary skill in the art upon reading this disclosure, the base station 12 includes additional components (e.g., radio unit(s), processor(s), etc.). As illustrated, the base station 12 includes a cluster scheduling system 20. The cluster scheduling system 20 is implemented in hardware or a combination of hardware and software. For instance, in some embodiments, the cluster scheduling system 20 is implemented in software that is stored in a non-transitory computer readable medium (e.g., memory) and expected by one or more processors (e.g., Central Processing Units (CPUs)).

The cluster scheduling system 20 includes a wireless device selection function 24, a global prioritization function 26, a RAB division function 28, and a cluster scheduler 30. The wireless device selection function 24 operates to select, or identify, the set of wireless devices 16 that are expected to benefit from coordinated scheduling, as described above. The global prioritization function 26 then prioritizes the RABs of the wireless devices 16 to be scheduled in each TTI to provide, in this example, a prioritized or ordered RAB list. The RAB division function 28 then divides the prioritized RAB list into a first set of RABs (RAB SET 1) for cluster scheduling and a second set of RABs (RAB SET 2) for individual cell scheduling, as described above. The cluster scheduler 30 then performs cluster scheduling for the first set of RABs (RAB SET 1) as described above.

As illustrated, the global prioritization function 26 includes, in this embodiment, a differential PQ weight function 32, a PQ weight adjustment function 34, and a RAB prioritization function 36. The differential PQ weight function 32 operates to compute differential PQ weights for the RABs of the wireless devices 16 in the set of wireless devices 16 selected by the wireless device selection function 24, as described above. The PQ weight adjustment function 34 operates to adjust the PQ weights of the RABs of the wireless devices 16 that are: (a) to be scheduled in the TTI and (b) in the set of wireless devices 16 selected by the wireless device selection function 24 to thereby provide the prioritized RAB list. The RAB prioritization function 36 operates to prioritize RABs, as described above.

As illustrated in FIG. 7B, the base station 12 includes individual cell schedulers 22-1 through 22-N, which in this example are more specifically downlink schedulers for the individual cells 14. The individual cell schedulers 22 operate to perform individual cell scheduling as described above.

As also illustrated in FIG. 7B, the base station 12 includes separate protocol stacks for each of the cells 14. The protocol stacks include Radio Resource Control (RRC) layers 38-1 through 38-N, Medium Access Control (MAC) layers 40-1 through 40-N, and Physical (PHY) layers 42-1 through 42-N. The individual cell schedulers 22-1 through 22-N are implemented in the corresponding MAC layers 40-1 through 40-N. The base station 12 includes additional components that may be utilized to obtain measurements that can be used by the cluster scheduling system 20. In particular, the RRC layers 38-1 through 38-N include measurement report triggering functions 44-1 through 44-N and measurement report collection functions 46-1 through 46-N that operate to trigger and collect measurement reports from the wireless devices 16 connected to the corresponding cells 14. As described above, these measurement reports may be utilized by the cluster scheduling system 20. In addition, the PHY layers 42-1 through 42-N may include SRS measurement functions 48-1 through 48-N that operate to perform SRS measurements on the uplinks for the corresponding cells 14. Again, these SRS measurements may be utilized by the cluster scheduling system 20 as described above.

Figure 8:
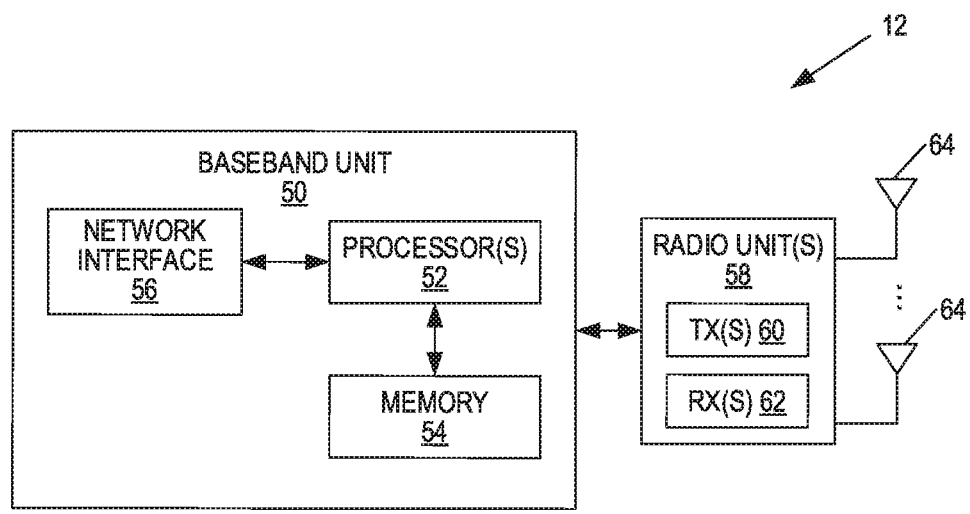
FIG. 8 is a block diagram of the base station of FIGS. 1A and 1B according to some embodiments of the present disclosure.

FIG. 8 illustrates the base station 12 according to another embodiment of the present disclosure. As illustrated, the base station 12 includes a baseband unit 50 including one or more processors (e.g., CPU(s), Application Specific Integrated Circuit(s) (ASIC(s)), and/or Field Programmable Gate Array(s) (FPGA(s))), memory 54, and a network interface 56 and one or more radio units 58 including one or more transmitters 60 and one or more receivers 62 coupled to one or more antennas 64. In some embodiments, the functionality of the base station 12 described above is partially or wholly implemented in software stored in the memory 54 and executed by the processor(s) 52.

As opposed to purely centralized scheduling for all of the RABs for all of the wireless devices 16 in the cluster of cells 14, the embodiments described herein enable ICIC for the wireless devices 16 that would benefit from this coordination and individual cell scheduling for wireless devices 16 that would not benefit from this coordination. In this manner, the computational burden on the cluster scheduler is significantly reduced as compared to a purely centralized scheduler.

The following acronyms are used throughout this disclosure.

3GPP 3$^{rd}$ Generation Partnership Project
ASIC Application Specific Integrated Circuit
CoMP Coordinated Multipoint Transmission
CPU Central Processing Unit
CQI Channel Quality Indication
eNB Enhanced or Evolved Node B
FPGA Field Programmable Gate Array HII High Interference Indicator
ICIC Inter-Cell Interference Coordination
LTE Long Term Evolution
MAC Medium Access Control
OI Overload Indicator
PDCCH Physical Downlink Control Channel
PF Proportional Fair
PHY Physical
PQ Priority Queue
QoS Quality of Service
RAB Radio Access Bearer
RNTP Relative Narrowband Transmit Power
RRC Radio Resource Control
RRH Remote Radio Head
RSRP Reference Signal Received Power
RSRQ Reference Signal Received Quality
SINR Signal-to-Interference-Plus-Noise Ratio
SRS Sounding Reference Signal
TTI Transmit Time Interval
UE User Equipment Those skilled in the art will recognize improvements and modifications to the embodiments of the present disclosure. All such improvements and modifications are considered within the scope of the concepts disclosed herein and the claims that follow.

What is claimed is:

1. A method of operation of a base station in a cellular communications network to provide scheduling for a cluster of cells controlled by the base station, comprising:
    identifying a first set of Radio Access Bearers, RABs, for cluster scheduling for a transmit time interval and a second set of RABs for individual cell scheduling for the transmit time interval, where the first set of RABs and the second set of RABs are non-overlapping sets;
    performing cluster scheduling for the first set of RABs for the transmit time interval, where cluster scheduling is scheduling performed across all cells in the cluster of cells; and
    performing individual cell scheduling for the second set of RABs for the transmit time interval, where individual cell scheduling is scheduling performed individually for one or more of the cells in the cluster of cells,
wherein the method further comprises:
    identifying a set of wireless devices that are connected to a plurality of cells in the cluster of cells controlled by the base station and expected to benefit from coordinated scheduling; and
    adjusting priorities of RABs of wireless devices in the set of wireless devices;
    wherein identifying the first set of RABs for cluster scheduling for the transmit time interval and the second set of RABs for individual cell scheduling for the transmit time interval comprises:
        identifying the first set of RABs for cluster scheduling for the transmit time interval and the second set of RABs for individual cell scheduling for the transmit time interval based on the adjusted priorities of the RABs of at least a subset of the wireless devices in the set of wireless devices.

2. The method of claim 1, wherein the cluster of cells controlled by the base station comprise at least one of a group consisting of: one or more cells of the base station, one or more cells of one or more remote radio heads controlled by the base station, and one or more cells of one or more other base stations controlled by the base station.

3. The method of claim 1, wherein identifying the set of wireless devices that are connected to the plurality of cells in the cluster of cells controlled by the base station and expected to benefit from coordinated scheduling comprises:
    for each wireless device of a plurality of wireless devices connected to the plurality of cells in the cluster of cells controlled by the base station, determining whether a performance gain for the wireless device is expected to improve by at least a threshold amount in response to radio resource coordination with one or more interfering cells with respect to the wireless device, the one or more interfering cells being one or more of the plurality of cells in the cluster of cells controlled by the base station;
    wherein the wireless device is identified as being expected to benefit from coordinated scheduling if the performance gain for the wireless device is expected to improve by at least the threshold amount in response to radio resource coordination with the one or more interfering cells.

4. The method of claim 3, wherein the radio resource coordination comprises suppressing or muting radio resources in the one or more interfering cells that correspond to radio resources scheduled for the wireless device in a serving cell of the wireless device in the cluster of cells controlled by the base station.

5. The method of claim 3, wherein the radio resource coordination comprises transmitting, in radio resources in the one or more interfering cells that correspond to radio resources scheduled for the wireless device in a serving cell of the wireless device in the cluster of cells controlled by the base station, the same information as transmitted in the radio resources scheduled for the wireless device in the serving cell of the wireless device.

6. The method of claim 1, wherein adjusting the priorities of the RABs of the wireless devices in the set of wireless devices comprises, for each RAB:
    computing a differential Priority Queue, PQ, weight for the RAB that is indicative of an expected performance gain for the RAB if clustered scheduling is used for the RAB; and
    adjusting a PQ weight for the RAB based on the differential PQ weight.

7. The method of claim 6, wherein computing the differential PQ weight for the RAB comprises computing the differential PQ weight as a ratio of: (a) a function of a Signal-to-Interference-Plus-Noise Ratio, SINR, for the RAB assuming radio resource coordination with one or more dominant interferer cells and (b) a function of a SINR for the RAB without radio resource coordination with the one or more dominant interferer cells.

8. The method of claim 7, wherein adjusting the PQ weight for the RAB comprises summing an initial value for the PQ weight for the RAB and the differential PQ weight for the RAB to thereby adjust the PQ weight for the RAB.

9. The method of claim 6, wherein the RABs of the wireless devices connected to the plurality of cells in the cluster of cells controlled by the base station have corresponding PQ weights, and identifying the first set of RABs for cluster scheduling for the transmit time interval and the second set of RABs for individual cell scheduling for the transmit time interval based on the adjusted priorities of the RABs of at least a subset of the wireless devices in the set of wireless devices comprises:
    prioritizing the RABs of the wireless devices connected to the plurality of cells in the cluster of cells controlled by the base station that are to be scheduled for the transmit time interval, including the RABs of the wireless devices in the set of wireless devices that are to be scheduled for the transmit time interval, based on the PQ weights of the RABs; and dividing the RABs of the wireless devices connected to the plurality of cells in the cluster of cells controlled by the base station that are to be scheduled for the transmit time interval into the first set of RABs and the second set of RABs based on a defined PQ weight threshold.

10. The method of claim 9, wherein the defined PQ weight threshold is a lowest PQ weight of any of the RABs of the set of wireless devices that are to be scheduled for the transmit time interval that results in a number of RABs in the first set of RABs being less than a predefined limit on the number of RABs in the first set of RABs.

11. The method of claim 1, wherein the first set of RABs consist of: one or more of the RABs of the at least a subset of the wireless devices in the set of wireless devices having priorities after adjustment that are greater than a defined threshold; and one or more RABs of one or more other wireless devices connected to the plurality of cells in the cluster of cells controlled by the base station that are to be scheduled in the transmit time internal and have priorities that are greater than the defined threshold.

12. The method of claim 11, wherein the defined threshold is a lowest priority, after adjustment, of any of the RABs of the set of wireless devices that are to be scheduled for the transmit time interval that results in the number of RABs in the first set of RABs being less than a predefined limit on the number of RABs in the first set of RABs.

13. The method of claim 1, further comprising:
identifying a set of wireless devices from all wireless devices that are connected to a plurality of cells in the cluster of cells controlled by the base station and expected to benefit from coordinated scheduling; and
adjusting priorities of RABs of the wireless devices in the set of wireless devices;
wherein identifying the first set of RABs for cluster scheduling for the transmit time interval and the second set of RABs for individual cell scheduling for the transmit time interval comprises:
identifying the first set of RABs for cluster scheduling for the transmit time interval and the second set of RABs for individual cell scheduling for the transmit time interval based on the adjusted priorities of the RABs of a subset of the wireless devices in the set of wireless devices having RABs that are to be scheduled in the transmit time interval.

14. The method of claim 13, wherein identifying the first set of RABs for cluster scheduling for the transmit time interval and the second set of RABs for individual cell scheduling for the transmit time interval is further based on non-adjusted priorities of RABs of other wireless devices that are not in the set of wireless devices and are to be scheduled for the transmit time interval.

15. The method of claim 1, wherein performing cluster scheduling for the first set of RABs for the transmit time interval comprises, for each RAB in the first set of RABs:
scheduling one or more radio resources on a serving cell of the corresponding wireless device for the RAB, the serving cell being one of a plurality of cells in the cluster of cells controlled by the base station; and
reserving the same one or more radio resources on one or more interfering cells of the corresponding wireless device, the one or more interfering cells being one or more of the plurality of cells in the cluster of cells controlled by the base station other than the serving cell of the wireless device.

16. The method of claim 15, wherein reserving the same one or more radio resources on the one or more interfering cells comprises tagging the same one or more radio resources on the one or more interfering cells for low power transmission or no transmission.

17. The method of claim 15, wherein reserving the same one or more radio resources on the one or more interfering cells comprises tagging the same one or more radio resources on the one or more interfering cells for transmitting the same information transmitted on the serving cell of the wireless device.

18. A base station in a cellular communications network enabled to provide scheduling for a cluster of cells controlled by the base station, comprising:
one or more radio units;
at least one processor; and
a memory storing software instructions executable by the at least one processor whereby the base station is operative to:
identify a first set of Radio Access Bearers, RABs, for cluster scheduling for a transmit time interval and a second set of RABs for individual cell scheduling for the transmit time interval, where the first set of RABs and the second set of RABs are non-overlapping sets;
perform cluster scheduling for the first set of RABs for the transmit time interval, where cluster scheduling is scheduling performed across all cells in the cluster of cells; and
perform individual cell scheduling for the second set of RABs for the transmit time interval, where individual cell scheduling is scheduling performed individually for one or more of the cells in the cluster of cells,
wherein the base station is further operative to:
identify a set of wireless devices that are connected to a plurality of cells in cluster of cells controlled by the base station and expected to benefit from coordinated scheduling; and
adjust priorities of RABs of wireless devices in the set of wireless devices; wherein identifying the first set of RABs for cluster scheduling for the transmit time interval and the second set of RABs for individual cell scheduling for the transmit time interval comprises:
identify the first set of RABs for cluster scheduling for the transmit time interval and the second set of RABs for individual cell scheduling for the transmit time interval based on the adjusted priorities of the RABs of at least a subset of the wireless devices in the set of wireless devices.

* * * * *